A. B. SMITH.
METHOD OF TIGHTENING TIRES AND SPOKES IN FELLIES.
APPLICATION FILED NOV. 20, 1909.
965,341.
Patented July 26, 1910.
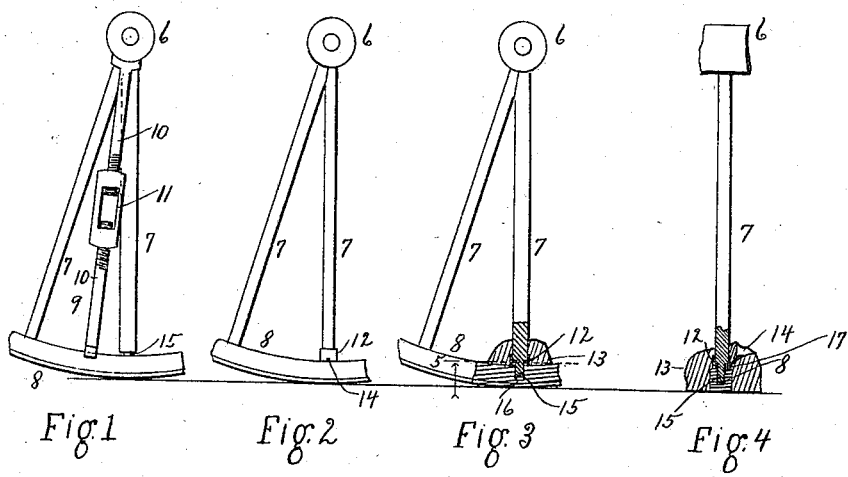
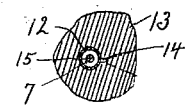
Fig. 5.
Witnesses
Inventor
Alfred B. Smith

UNITED STATES PATENT OFFICE.

ALFRED B. SMITH, OF NEAR TOPEKA, KANSAS.

METHOD OF TIGHTENING TIRES AND SPOKES IN FELLIES.

965,341.  Specification of Letters Patent.  Patented July 26, 1910.

Application filed November 20, 1909. Serial No. 529,030.

*To all whom it may concern:*

Be it known that I, ALFRED B. SMITH, a citizen of the United States, residing near Topeka, in the county of Shawnee and State of Kansas, have invented a new and useful Improvement in the Method of Tightening Tires and Spokes in Fellies, of which the following is a specification.

My invention is a method of tightening the tires and spokes of a wheel without removing the tire.

The object is to avoid the usual removing of the tire which is necessary under present practice to reset and tighten a tire or to tighten the spokes. And my invention consists principally of pressing the end of the spoke and the felly and tire apart, and then filling molten metal, such as hard Babbitt metal, in the interstices between the spoke and the felly.

In the drawing accompanying and forming part of this specification, and in the description of the drawing, I have shown a preferred form of utilizing my invention and what I deem to be the best mode of applying the principles thereof, but it is to be understood that obvious changes in form, proportions, and materials, the substitution of equivalent parts and steps, may be resorted to, within the scope of the appended claims, without departing from the spirit of my invention.

Figure 1 is an elevation of part of a vehicle wheel with a tool applied thereto to spread apart the felly and the end of the spoke. Fig. 2 is a similar view of part of the wheel so expanded with a paper or piece of sheet metal wrapped around the end of the spoke to form the mold. Fig. 3 is a similar view in section showing the mold complete, ready for pouring in the molten metal. Fig. 4 is a transverse section showing the substance of Fig. 3 with the metal in place. Fig. 5 is a section through the line 5 of Fig. 3.

Similar reference characters indicate like or corresponding parts throughout the several views.

6 may represent the hub, 7, the spokes, and 8, the tire and felly of a wheel.

9 may represent a tool for pressing the felly and tire outwardly in order to spread the felly and tire apart from the end of the spoke, in other words to tighten the tire; and this tool may consist merely of the two rods 10, 10, with the turn-buckle 11, and may be adapted to be set between the felly and the hub, as indicated.

Having spread the felly apart from the end of the spoke, I then wrap around the end of the spoke a piece of paper or very pliable sheet metal 12, which abuts against the inner side of the felly, thus inclosing the gap between the end of the spoke and the felly. I then place around the felly and end of the spoke a quantity of plastic material, such as putty or clay to complete the mold, the paper or sheet metal preventing the plastic material from entering the crevice between the end of the spoke and the felly. This plastic material is represented by the numeral 13. I then make a hole through the putty or clay or other plastic material, and the paper or sheet metal, as indicated at 14, and through this I pour in the molten metal, such as hard Babbitt metal or other suitable metal, which flows into the crevice and fills not only the crevice but also all the interstices between the tenon 15 and the sides and bottom of the mortise 16, as indicated at 17, and when this metal is cooled, it forms a very sound joint between the end of the spoke and the tenon and the felly and mortise. When the metal is hard, the tool 9 may be removed, as may also the mold, both the plastic material and the paper or sheet metal, and the gate may be broken off, leaving the joint as neat and as durable if not more durable than the original. Obviously a single spoke may be tightened in this manner, without removing the tire; or any number may be similarly tightened; or the tire may be tightened by so tightening a number or all of the spokes in the wheel, all without removing the tire from the wheel.

What I claim is:

1. In the art described, the process of spreading apart the end of the spoke and the felly, forming a temporary mold around the crevice, filling the crevice with molten metal, permitting the metal to cool and harden, and then removing the mold.

2. In the art described, the process of spreading apart the felly and the end of the spoke, forming a temporary mold around the crevice with a gate in said mold, filling the crevices between the end of the spoke and the felly and between the tenon and the bottom and sides of the mortise with molten metal, and removing the temporary mold when the metal is hardened.

3. In the art described, the process of spreading apart the felly and the end of the spoke, forming a mold around the crevice between the felly and the end of the spoke, and filling said crevice and the crevice between the tenon and the bottom and sides of the mortise with molten metal.

In testimony whereof I have hereunto signed my name in the presence of witnesses.

ALFRED B. SMITH.

Witnesses:
    JOHN A. HULIT,
    J. M. STARK.